(No Model.)
E. A. STARKE.
PROCESS OF MAKING NEUTRAL ALKALINE SULFATES FROM BISULFATES.
No. 542,429. Patented July 9, 1895.
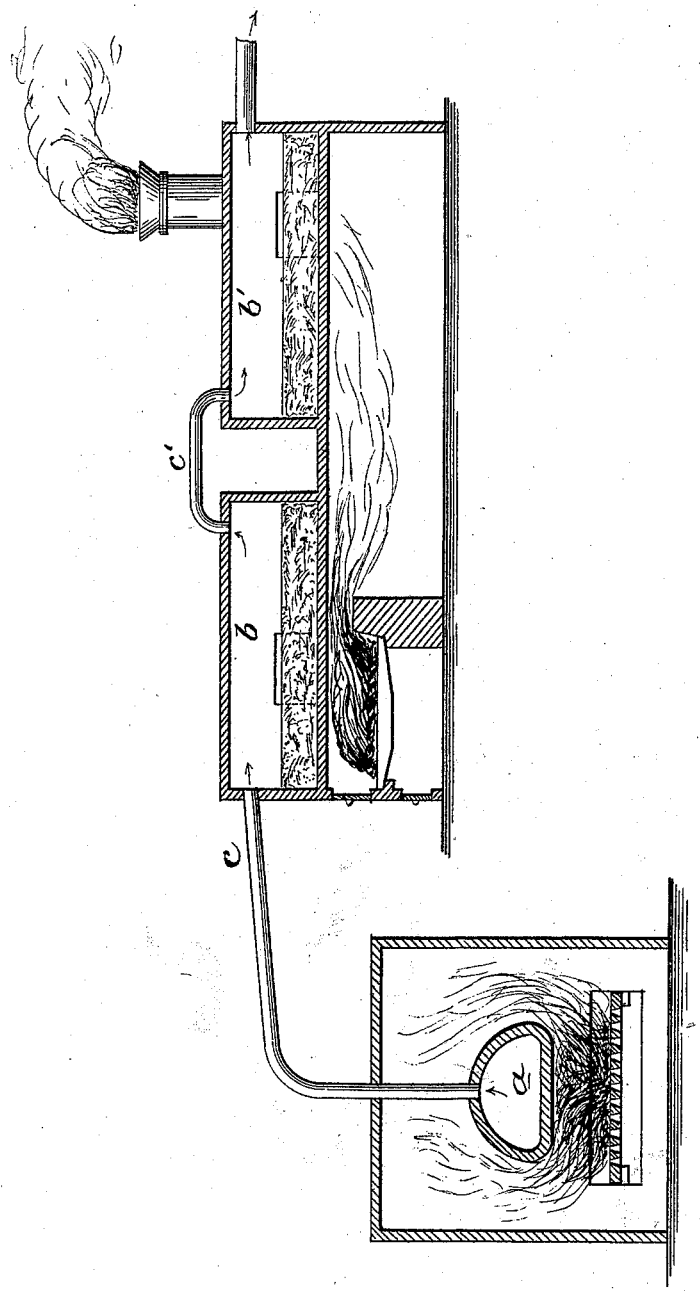
WITNESSES
INVENTOR
Eric A. Starke,
by Dewey & Co
his Attorneys

UNITED STATES PATENT OFFICE.

ERIC A. STARKE, OF SAN FRANCISCO, CALIFORNIA.

PROCESS OF MAKING NEUTRAL ALKALINE SULFATES FROM BISULFATES.

SPECIFICATION forming part of Letters Patent No. 542,429, dated July 9, 1895.

Application filed October 15, 1894. Serial No. 525,965. (No specimens.)

*To all whom it may concern:*

Be it known that I, ERIC A. STARKE, a citizen of the United States, residing in the city and county of San Francisco, State of California, have invented an Improvement in the Manufacture of Neutral Alkaline Sulfates and Sulfuric Acid; and I hereby declare the following to be a full, clear, and exact description of the same.

The figure shows an apparatus adapted for the carrying out of my invention.

My invention relates to the manufacture of neutral sulfates with alkaline bases from what are known as "acid sulfates," and in the recovery therefrom of the excess of sulfuric acid and the manufacture of an additional quantity of new acid.

In the manufacture of high explosives using nitroglycerin or other forms of nitro compound, it is customary to manufacture the nitric acid from nitrate of soda, and the usual method pursued is that of treating the nitrate of soda with an excess of sulfuric acid.

By my invention I am able to separate the acid so as to leave a neutral sulfate which is useful in the arts, and to make at the same time an additional quantity of sulfuric acid, which is available for any of the uses to which it may be desired to put it.

In carrying out my process I take the acid sulfate and add to it a portion of sulfur. Then by burning or heating the mass together the sulfur takes up a portion of the oxygen from the sulfuric acid and forms sulfurous-acid vapor, leaving the sulfate of soda in a neutral condition. The sulfurous acid is then converted into sulfuric acid in the usual chamber process. I have found it preferable to first pulverize the acid sulfate, which may be done by any of the well-known forms of crushing apparatus or disintegrators, then mix it with a proportion of sulfur varying in quantity from six per cent. of the mass upward, which may be melted or otherwise prepared, so as to intimately mix with the sulfate, and the latter being placed in a mold the melted sulfur is poured over it, mixing through the interstices of the mass and forming a solid brick. When these bricks are sufficiently cooled they are removed from the mold and are then burned or heated, when the action previously described will take place.

If the operation is carried on in a closed chamber, the sulfur may be vaporized and admitted into the chamber containing the acid sulfate where it unites with a part of the oxygen of the sulfuric acid, and forms sulfurous acid vapor which passes on out of the chamber. A form of apparatus that will be found useful in carrying out this operation is shown in the drawing and comprises a retort $a$, in which the sulfur is vaporized and chambers $b\ b'$, containing the acid sulfates, said retort and chambers being heated by a fire below. The retort connects with one of the chambers $b$ by means of a pipe $c$, while said chamber connects with the other chamber $b'$ by means of a pipe $c'$. By this means the sulfur fumes pass into and through the chambers, as described.

Another method is to place the acid sulfate and the sulfur together in a closed chamber or retort and then heat them until the desired reaction takes place. The reaction which takes place is as follows:

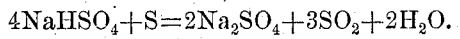

$$4NaHSO_4 + S = 2Na_2SO_4 + 3SO_2 + 2H_2O.$$

A sufficient amount of the sulfuric acid remains united with the sodium to form a neutral sulfate, and the remainder being reduced to sulfurous acid passes off and is collected and may be formed into sulfuric acid again in the usual manner for making this acid.

Having thus described my invention, what I claim as new, and desire to secure by Letters Patent, is—

1. The manufacture of neutral alkaline sulfate consisting in the heating of sulfur in contact with an acid sulfate.

2. The manufacture of neutral alkaline sulfate and the production of sulfuric acid from an acid sulfate, consisting in heating sulfur with the acid sulfate, then collecting the resulting sulfurous acid fumes and converting them into sulfuric acid.

In witness whereof I have hereunto set my hand.

ERIC A. STARKE.

Witnesses:
S. H. NOURSE,
H. F. ASCHECK.